July 25, 1961 W. T. RENTSCHLER 2,993,422
PHOTOGRAPHIC CAMERA WITH AUTOMATIC EXPOSURE SETTING
Filed Sept. 3, 1959 4 Sheets-Sheet 1
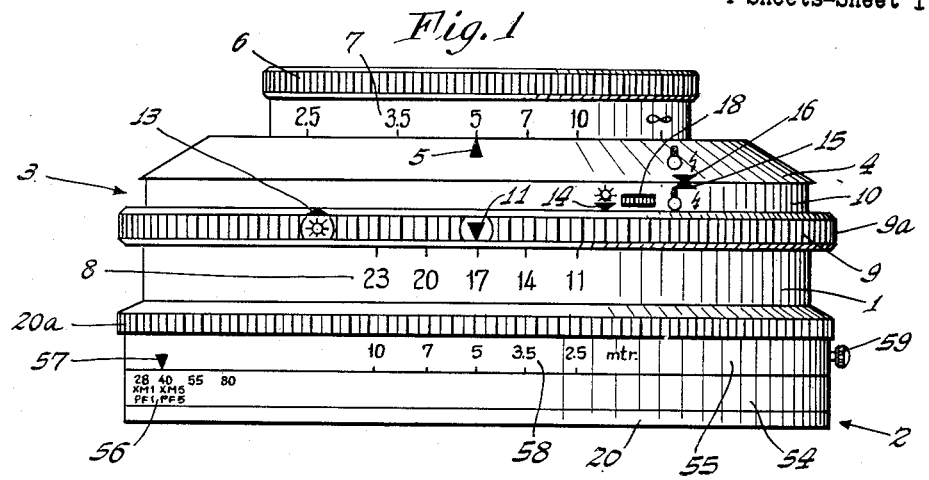
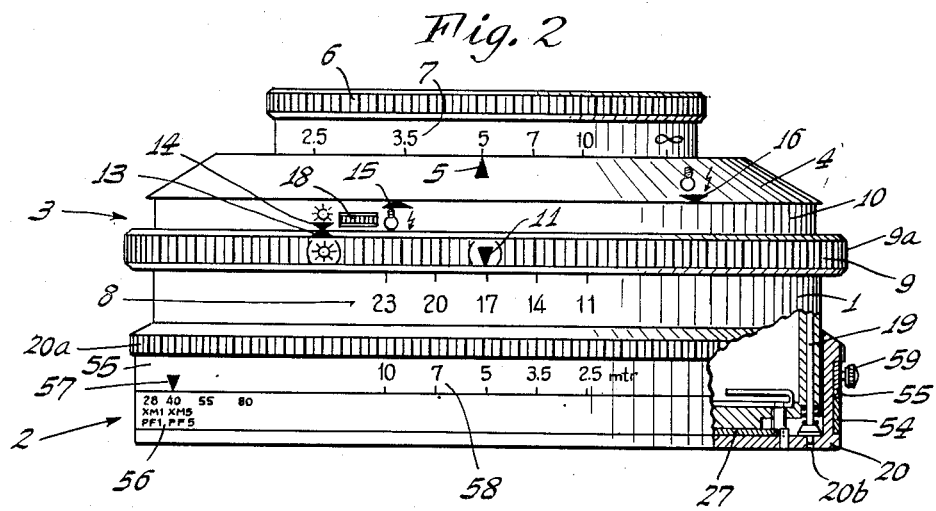
INVENTOR.
Waldemar T. Rentschler
BY
Munn, Liddy, Daniels & March
ATTORNEYS

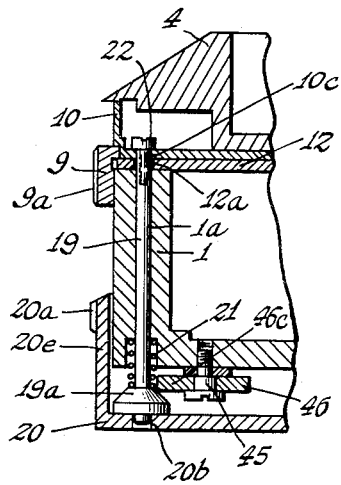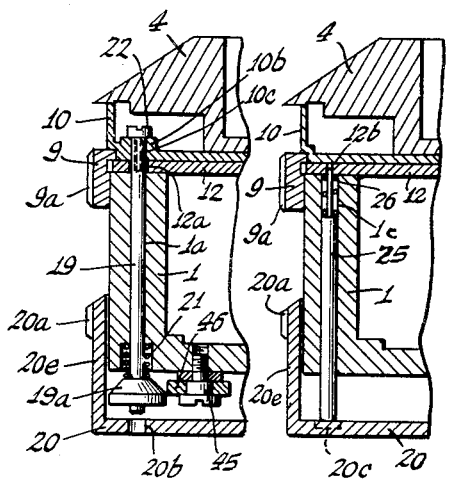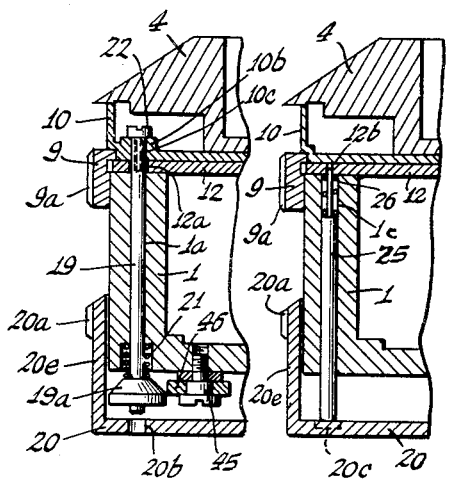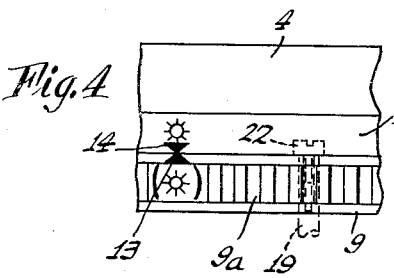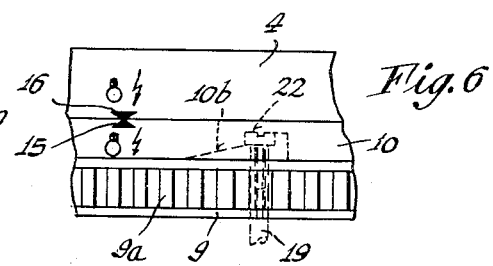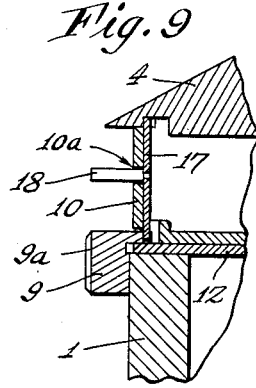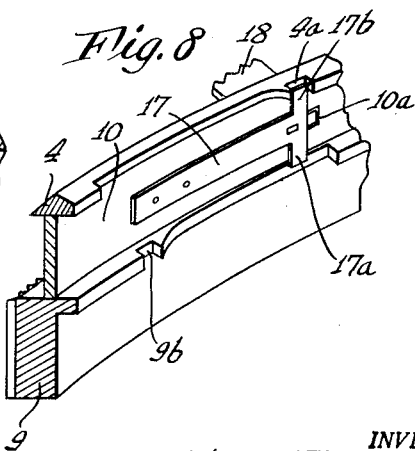

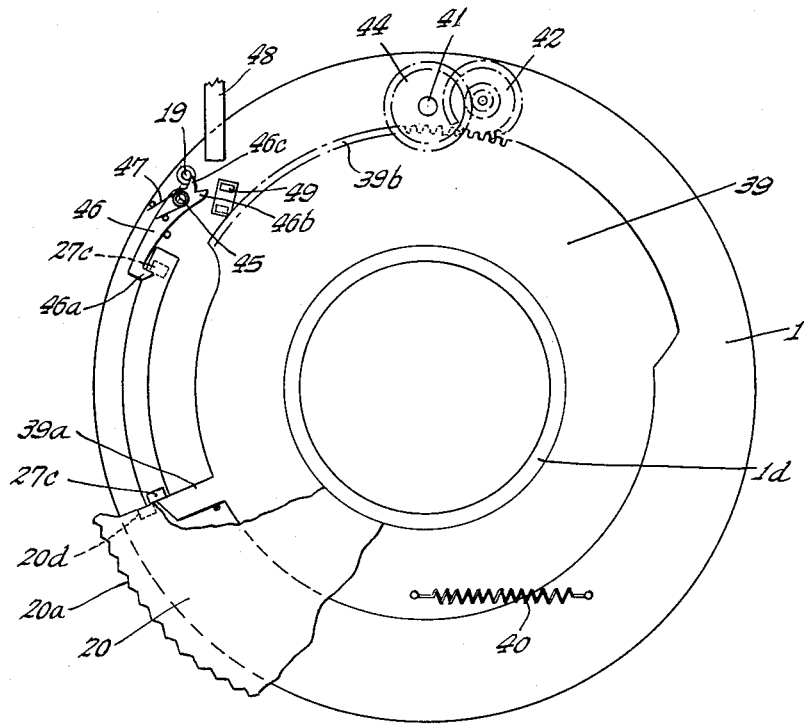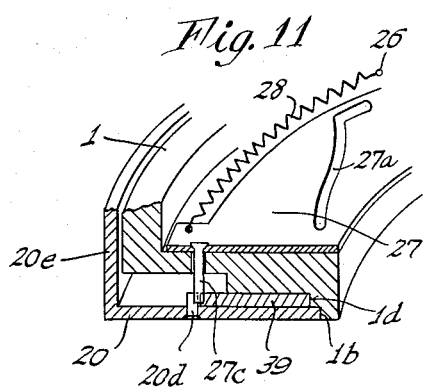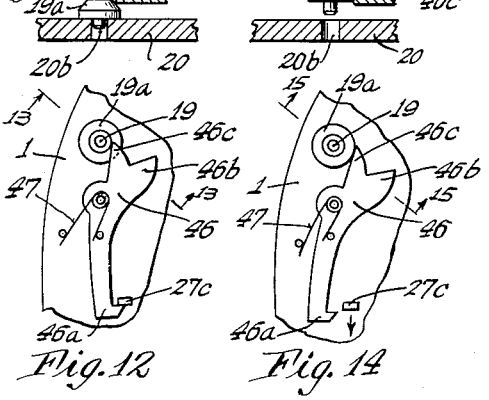

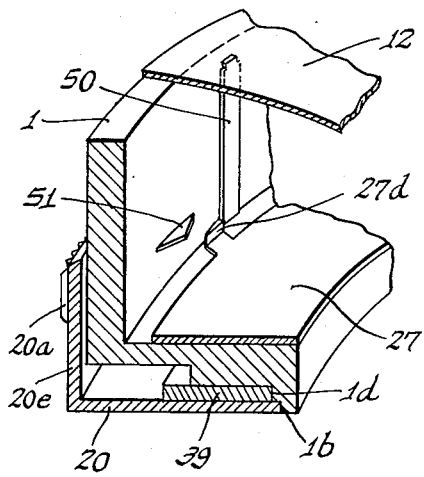
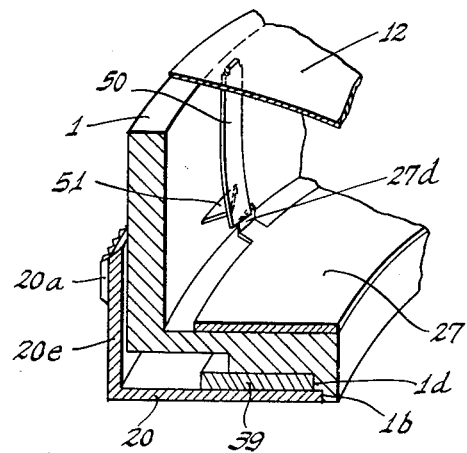
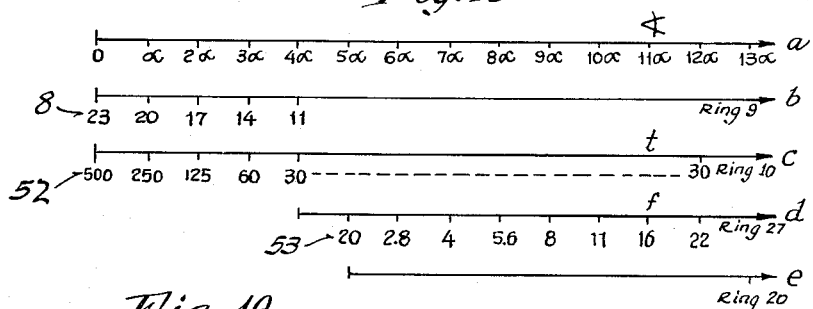
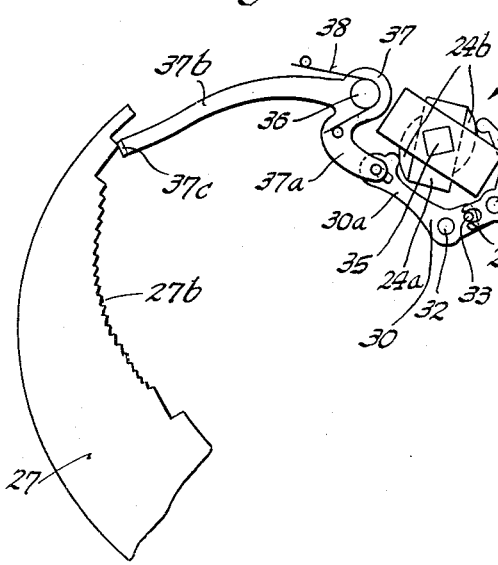
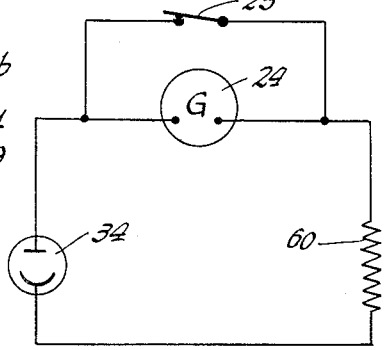

United States Patent Office 2,993,422
Patented July 25, 1961

2,993,422
PHOTOGRAPHIC CAMERA WITH AUTOMATIC EXPOSURE SETTING
Waldemar T. Rentschler, Calmbach (Enz), Germany, assignor to Alfred Gauthier G.m.b.H., Calmbach (Enz), Germany, a corporation of Germany
Filed Sept. 3, 1959, Ser. No. 837,910
Claims priority, application Germany Sept. 17, 1958
18 Claims. (Cl. 95—10)

This invention relates to photographic cameras of the type having automatic exposure regulating or setting means, and having setting or operating members which can be set or adjusted to several positions and which control the speed or exposure time and also the diaphragm opening of the camera.

Cameras of the above type make it easier and more convenient for the photographer or operator to properly set or adjust the camera so as to take into account the various essential exposure factors; however, in existing cameras having such setting means it is still necessary for the operator to make certain decisions with respect to the diaphragm and speed setting functions. Also, in order to take into consideration the degree of sensibility of different types of film, it is necessary that special adjusting devices be provided, functioning on either a mechanical, optical or electrical basis, for insertion in the connection between the photo-electric cell which controls the exposure regulating device and the speed and diaphragm setting members of the camera. The construction and arrangement of such special adjusting devices have required a certain amount of space and a number of structural members, which is often a disadvantage. In addition, such special adjusting devices are apt to impair the reliability and accuracy of operation of the exposure regulating device.

These disadvantages are obviated by the present invention, and one object of the invention is to provide a novel and improved photographic camera of the above-described kind, which enables properly exposed and useful photographs to be obtained without any decision being required on the part of the operator as regards the diaphragm and speed settings, and wherein the taking into consideration of the sensibility of different types of film requires neither additional expenditure in the form of additional structural members nor interference with or modification of the exposure setting device of the camera.

This object is accomplished, in accordance with the invention, by associating the speed or exposure-time setting member, which setting member is movable for effecting a range of uniformly graduated exposure times suited for the taking of photographs by hand, with a film sensibility scale, and by making the diaphragm setting member automatically adjustable in response to the action of the exposure regulating device which is controlled by the existing light conditions. By this organization the invention provides a semi-automatic or fully automatic exposure setting or regulation which completely frees the photographer or operator from any mental work. In consequence, both of the factors of "exposure time" and "diaphragm" may cease to exist, as regards the action required of the operator in the taking of a picture. By the establishment of the limitation of the speed setting member to only those exposure times which are suited for taking photographs by hand there is made possible the obtaining of good exposures of moving objects, which exposures are not spoiled by moving the camera, for each and every position of the speed setting member corresponding to every film sensibility for which the camera may be set. Moreover, in accordance with the invention, the taking into consideration of the different film sensibilities does not require the provision of a special adjusting device, nor does it involve interference with or modification of the exposure regulating device, since the latter cooperates with the diaphragm in exactly the same manner for each different setting of film sensibility. This provides the further advantageous result that the operating range of the automatic exposure regulator comprises the same range of lighting for all of the film sensibility settings. A known type of indicating device by itself may be utilized to indicate when the existing lighting exceeds or falls below the admissible range, so that the photographer prior to taking the picture has merely to decide whether or not the prevailing light conditions are satisfactory for the photograph desired. When taking pictures by the use of permanent lighting, i.e. especially daylight, the invention thus utilizes the various respective exposure times or shutter speeds in conjunction with the set or adjusted film sensibility value. In contrast to this situation, flash exposures where flash bulbs and X-synchronization are used, require a certain minimum exposure time generally on the order of 1/25 or 1/30 of a second. A camera as provided by the invention can be developed for carrying out such flash bulb photographs in an especially advantageous manner, particularly while maintaining the respective film sensibility setting, this being possible by constructing the speed setting member of two relatively adjustable members or parts the first of which cooperates with the film sensibility scale and the second of which cooperates with an exposure time or speed regulating or setting device. For the purpose of concurrent adjustment of these parts over the range of the film sensibility scale, the two parts may be coupled together in a single relative position, which is indicated by an arrangement of setting marks or symbols referring to the presence of permanent light, as for example daylight. Also, when the second part is disconnected or uncoupled from the first part it may be shifted into a setting position which is associated with an exposure time suited for flash photographs and which is indicated by setting marks or symbols referring to the use of flashbulbs.

In the case of flash exposures, the setting of the diaphragm determined by the type of flashbulb which is to be used and by the distance selected. In order to enable such a setting of the diaphragm to be carried out in cameras having fully automatic exposure adjustment, a further development of the invention provides a change-over or reversing device, by means of which the light-responsive exposure regulating or setting device may be switched off and the diaphragm changed over for manual setting or adjustment.

In order to have the advantage of fully automatic exposure regulation together with the above-mentioned reversibility, the diaphragm may be constituted as a spring-type device which is influenced in a direction of minimum or maximum opening by means of a spring. In conjunction with such spring diaphragm, there is provided a mechanical stop or lug, which is controlled by the exposure regulating device in response to the prevailing light conditions, the arrangement being such that a diaphragm actuating member may come to bear against the said stop lug after having travelled over a longer or shorter path of motion under the action of its biasing spring.

To provide for a simple and quick operation of the camera, the diaphragm is preferably shifted in response to cocking of the camera shutter from the adjusted position determined by the mechanical stop or lug, being shifted against the action of the biasing spring into an end or extreme position which corresponds to either the largest or else the smallest diaphragm opening, the diaphragm actuating member being retained in this end position by means of a releasable locking device.

The simplicity and reliability of operation of the camera may be further increased by effecting release of the said locking device in response to release of the shutter, as for example by actuation of the shutter release mechanism. The release of the shutter and release of the diaphragm actuating member are so related that the diaphragm will reach its predetermined or adjusted position and be correspondingly opened prior to the shutter starting to open.

In accordance with the invention, in order to obtain in conjunction with the above-described automatic adjustment of the diaphragm in response to existing light conditions even if the shutter should be already cocked when changing the camera from "flash" setting to "permanent light" or "daylight" setting there is further provided a special device by which the diaphragm will be shifted to one of its extreme positions while the camera is being changed or reversed from "flash" exposures to "permanent light" exposures.

In the accompanying drawings and the following specification the advantages of the invention are further explained and an embodiment of the invention is described wherein the above objectives are accomplished.

FIGURE 1 is a side elevational view of a photographic intra-lens shutter as provided by the invention, the said shutter being set for flash exposures.

FIG. 2 is a side elevational view similar to that of FIG. 1 but showing a portion of the structure in axial section, the setting of the shutter being for "permanent light" or daylight. The portion in section shows details of the diaphragm structure as well as a portion of a locking device cooperating with the diaphragm setting member and controlled by the speed setting member of the shutter.

FIG. 3 is a fragmentary longitudinal sectional view of the shutter shown in FIG. 2, illustrating on an enlarged scale the locking device for the diaphragm setting member. The locking device is shown in its operative position, with the camera set for daylight photography.

FIG. 4 is a fragmentary top or plan view, showing a portion of the speed setting member in the daylight setting position correlated with the operative position of the locking device of FIG. 3.

FIG. 5 is a view like FIG. 3, but showing the locking device in its inoperative position, corresponding to the camera setting for flash exposures.

FIG. 6 is a fragmentary top or plan view of the speed setting member shown in the "flash" position, corresponding to the conditions shown in FIG. 5.

FIG. 7 is a fragmentary sectional view in some respects similar to those of FIGS. 3 and 5, showing a portion of the photographic intra-lens shutter in axial section and illustrating a locking device which is controlled by the diaphragm setting member and which cooperates with the exposure time or speed setting member, for locking the latter in the setting position shown in FIG. 6.

FIG. 8 is a fragmentary perspective view showing a portion of the speed setting member of the shutter.

FIG. 9 is a fragmentary sectional view of the shutter, showing the structure and mounting of the speed setting member on the associated parts.

FIG. 10 is a rear elevational view of an intra-lens shutter as provided by the invention, showing the structure and arrangement of the locking, actuating and setting members for the diaphragm.

FIG. 11 is a fragmentary perspective view, showing a portion of the spring-biased diaphragm actuating member cooperating with its setting and tensioning members.

FIG. 12 is a fragmentary plan view of a second locking device responsive to the first or initial locking device for the diaphragm setting memebr, to effect a locking of the diaphragm actuating member in one extreme position when the shutter is adjusted for permanent light or daylight. This second locking device is shown in its operative position.

FIG. 13 is a fragmentary sectional view, taken on the line 13—13 of FIG. 12.

FIG. 14 is a view similar to that of FIG. 12, but showing the second locking device for the diaphragm actuating member in its inoperative position, with the camera adjusted for taking flash pictures.

FIG. 15 is a fragmentary sectional view, taken on the line 15—15 of FIG. 14.

FIG. 16 is a fragmentary perspective view of the diaphragm actuating member cooperating with a setting or tensioning device which is actuated by the speed setting member.

FIG. 17 is a view similar to that of FIG. 16, but showing the diaphragm actuating member and the setting and tensioning device as out of engagement with each other.

FIG. 18 is a graph or chart showing the size and correlation of the paths of movement of the various setting and actuating members for speed and diaphragm.

FIG. 19 is a fragmentary plan view of the exposure regulating device and control mechanism, illustrating its cooperation with the diaphragm actuating member.

FIG. 20 is a schematic circuit diaphragm of the electrical part of the exposure regulating device shown in FIG. 19.

In the various figures, the housing of the photographic intra-lens shutter is indicated by the numeral 1. In the rear portion of the housing 1 there is mounted a lens diaphragm 2, which will be described in detail below, and on the front wall of the housing 1 an exposure-time or speed setting ring 3 is carried. The speed setting ring 3 will also be described in detail below. A front plate 4 serves to secure the speed setting ring 3 in position, in the well-known manner. The front plate 4 has, on its outer conical jacket, a setting or index mark 5 for cooperation with a range or distance scale 7 which is mounted on a distance setting ring 6 of the lens structure.

In order to obtain settings of the speed setting ring 3 in different positions associated with a range or scale of uniformly graduated exposure times or shutter speeds there is provided a fixed film sensibility scale 8 on the side wall of the shutter housing 1, with which the ring 3 is associated. The lens diaphragm 2 is arranged to be adjusted or set in response to existing light conditions, this being accomplished by means of an exposure regulating device also described in detail below.

In the illustrated embodiment of the invention, the uniformly graduated exposure-time or shutter-speed series comprises exposure time values ranging from $\frac{1}{30}$ of a second to $\frac{1}{500}$ of a second. Such a series is shown in FIG. 18, being indicated by the numeral 52, and being associated with the ring 10 of the shutter. The values of the speed scale are so correlated with the film sensibility values on the scale 8 that the lowest film sensibility, i.e. the value 11° DIN is correlated with the longest exposure time of $\frac{1}{30}$ of a second, and the values 14°, 17°, 20°, and 23° DIN are correlated respectively with exposure times of $\frac{1}{60}$ of a second, $\frac{1}{125}$ of a second, $\frac{1}{250}$ of a second, and $\frac{1}{500}$ of a second. This correlation is also clearly indicated in FIG. 18, and produces the effect that the exposure regulating device need cooperate only with the diaphragm of the shutter, which therefore facilitates and simplifies the construction of said device.

In the illustrated embodiment of the invention the exposure time or speed setting ring 3 is constructed of two relatively adjustable members or parts, in the form of rings 9 and 10. The ring 9 has a setting or index mark 11 which is adjustable with respect to the above-mentioned film sensibility scale 8 mounted on the shutter housing 1. The ring 9 is secured or held in its different adjusted positions either by friction or else by a well-known detent or notched device. To facilitate its adjustment the ring 9 is provided with a knurled outer periphery 9a. The second part or ring 10, on the other hand, serves to set or regulate the exposure time or speed and is for this purpose fixedly connected to a ring 12 (FIGS. 3, 5, 7 and 9) which comprises a cam (not shown for reasons of clarity of illustration) of a kind well known by itself, for setting or adjusting a well-known exposure-time arresting mechanism, which is also not shown herein.

The above described two-part construction of the speed setting ring 3, comprising the two relatively adjustable parts or rings 9 and 10, enables the second ring 10 to have a greater setting range than the first or manually engageable ring 9. This enables other speed settings to be had, beside those correlated with the film sensibility scale 8, by independent shifting of the ring 10. This is of special importance with flash synchronization, especially X-synchronization of combustion flashbulbs, which is always based on a specific time of exposure, as a rule on an exposure time value of 1/25 or 1/30 of a second.

In order to obtain the above-mentioned specific exposure time values, the two rings 9 and 10 are jointly adjustable over the range of the film sensibility scale 8, and for this purpose they may be coupled with one another and held in a single relative position, corresponding to the correlation of the exposure time or speed values with the film sensibility scale. To designate this position, which is the position required for taking photographs with permanent light, i.e. especially daylight, the rings 9 and 10 have setting marks 13 and 14 respectively, in the form of symbols of the sun.

For the purpose of enabling flash photographs to be taken, the two rings 9 and 10 are uncoupled from each other, and the second ring 10 is shifted into a setting position correlated with an exposure time or speed value which is especially suited for flash exposures, i.e. for example 1/30 of a second. This setting position is indicated, in the illustrated embodiment of the invention, by the marks 15 and 16, the mark 15 being carried by the ring 10 and the mark 16 being mounted on the stationary front plate 4. In order to clearly indicate that this setting of the ring 10 is for flash exposures, the marks 15 and 16 are made in the form of symbols of a flashbulb combined with a stylized lightning symbol, the latter being well known as a symbol for electronic flashes.

For the purpose of coupling the rings 9 and 10 for concurrent movement when the mechanism is set at "permanent light," a detent device comprising a spring tongue 17 (FIGS. 8 and 9) is fixed on the inner periphery of the ring 10. The spring tongue 17 cooperates, by means of a notched detent arm 17a provided thereon, with a recess 9b provided in the ring 9. To enable the spring tongue 17 to be actuated, the free end of the same is provided with a handle or fingerpiece 18, which passes radially outward of the ring 10, through a slot 10a provided in the said ring.

As may be readily seen in FIGS. 8 and 9, the spring tongue 17 is given a double function, being also constituted as a safety device for the ring 10 when adjusting the latter to its "flash" setting, thereby obviating the necessity for an additional member. For this purpose, the tongue 17 carries another detent arm 17b which cooperates with a detent opening or notch 4a provided on the stationary front plate 4.

As already stated above, when it is desired to take photographs with permanent light such as daylight the diaphragm is set automatically in response to functioning of the exposure regulating device as the latter responds to existing light conditions. In the case of flash exposures, where light conditions are different before and during the exposure, the diaphragm is set in response to the type of flashbulb which is to be used, also taking into consideration the distance of the camera from the subject.

By the present invention the automatic setting of the diaphragm by the exposure regulating device for daylight pictures may be had, and also the diaphragm setting as determined by the type of flashbulb, by the provision of a change-over or reversing device, by means of which the exposure regulating mechanism may be switched off and the diaphragm may be changed over to enable it to be manually set or adjusted.

A reliable, simple and convenient operation of the camera is advantageously had, by the invention, by arranging the changeover device so that it can be actuated or shifted into the positions "permanent light" and "flash" in response to the adjusting movement of the second part of the speed setting member, i.e. the ring 10 of the present embodiment.

In the illustrated embodiment of the invention the changeover device comprises a releasable locking or latching mechanism, the movable portion of which cooperates with a manually settable member of the diaphragm to lock the same, at the time that the camera is being set for "permanent light" exposure, in a starting or extreme position associated with either the largest or the smallest diaphragm opening.

This locking or latching device, in the present embodiment of the invention, comprises a locking pin 19 which is longitudinally shiftable in a space-saving manner in a bore 1a provided in the side wall of the shutter housing 1. The manually operable member by which the diaphragm may be adjusted and which can be locked in its starting or extreme position by the pin 19 is constituted as a ring 20, provided with external knurling 20a to enable it to be conveniently grasped and turned. The ring 20 bears against a shoulder 1b provided on the back wall of the shutter housing 1.

In order to lock the manually operable ring 20 an opening or recess 20b is provided in the ring for receiving the locking pin 19, said pin being urged downward or into the said opening at the time that the ring 20 reaches its starting position as seen in FIG. 3 by means of a helical compression spring 21. To insure proper engagement of the pin 19 in the opening 20 an over path or excess travel is provided for the said ring, between the starting or extreme position thereof and the position just ahead of the latter, corresponding to the extreme end condition of the diaphragm; the opening 20b extends along said over path and is thus constituted as a slot.

In the present illustrated embodiment of the invention the second part 10 of the time setting ring 3 serves to actuate the pin 19. For this purpose, the ring 10 has a cam surface or ramp 10b adapted to engage a head 22 on the pin 19 to lift the pin against the action of the spring 21 as shown in FIG. 5. In this figure the pin 19 is removed from the opening 20b with the ring 10 being set at "flash." The locking pin 19 passes through the rings 10 and 12, being arranged in slots 10c and 12a thereof respectively and is continually spring-urged in engagement with the ring 10 by virtue of the head 22 engaging the upper surface of the ring as shown in FIGS. 3 and 5. The head 22 may be conveniently constituted as a cap screw, which is threaded into the locking pin 19 as shown.

An electric switch 23 (FIG. 20) serves to switch off the exposure regulating device when the diaphragm is changed over to the manual setting. The closing of the switch 23 will short circuit the galvanometer 24 of the exposure regulating device as shown. In a manner similar to that by which the locking pin 19 is actuated in response to movement of the ring part 10 to effect locking and unlocking of the manual setting ring 20, the switch 23 may be actuated into the positions "permanent light" and "flash," the permanent light position corresponding to the open position of the switch 23 and vice versa.

However, the first described switch 23 which short circuits the galvanometer 24 has the advantage of being economical to fabricate, and in addition avoid the necessity for interfering with the circuit of the galvanometer, which may have an adverse effect on the reliability of the exposure device.

In accordance with the invention, the manually operable setting ring 20 is always maintained in an initial or starting, extreme position when the shutter is changed over from "flash" to "permanent light," thereby to prevent obstruction of the automatic setting of the diaphragm, and this is effected by the provision of a second locking or latching device which is controlled by the manually operable setting ring 20 and which locks the ring 10 in the flash position as long as the manually operable setting ring 20 is in a position other than its initial or extreme starting position.

The said second locking or latching means for the ring 10 as shown in the present embodiment of the invention is constructed in a manner similar to the above-described locking means comprising the pin 19 which is engageable with the setting ring 20. This second locking means comprises a locking pin 25 (FIG. 7) which is longitudinally slidable in a bore 1c in the side wall of the shutter housing 1. One end of the locking pin 25 lies close to the manually operable setting ring 20, being held thereagainst under the action of a helical compression spring 26 carried in the bore 1c, whereas the other end of the pin 25 is received in an opening or recess 12b provided in the cam ring 12 of the speed setting mechanism.

FIG. 7 shows the locking pin 25 in its operative position, wherein the rings 10 and 12 are in the "flash" while the manually operable setting ring 20 occupies a position other than its initial or extreme starting position. To release the locking pin 25 there is provided on the ring 20 an axially extending recess 20c, which receives the lower end of the pin 25 when the ring 20 has reached its initial or extreme position. This causes the upper end portion of the locking pin 25 to shift out of the recess 12b of the ring 12, whereby the rings 12 and 10 are released for shifting into the "permanent light" position.

In accordance with the present invention, the diaphragm is constituted as a well-known spring diaphragm which is urged in one direction, either to effect the smallest or else the largest opening, by a suitable spring means. To provide for automatic setting of the diaphragm, an actuating member therefor, which has travelled over a longer or shorter path of movement under the action of the diaphragm biasing spring, is arranged to abut a mechanical stop lug which is controlled by the exposure regulating device responding to the existing light conditions. In the illustrated embodiment of the invention this diaphragm actuating member is constituted as a ring 27, having control slots 27a for well-known diaphragm segments not shown for reasons of clarity. The biasing spring is indicated at 28, comprising a helical extension spring having one end secured to the ring 27 and the other end fastened to a stationary pin 26, thereby to urge the diaphragm ring 27 in the direction of the smallest diaphragm opening, all as shown in FIG. 11.

The mechanical stop lug of the exposure regulating device which cooperates with the diaphragm actuating ring 27 is controlled in response to the positioning of a movable member or portion 24a of the galvanometer 24 (see FIG. 19).

In accomplishing this, the movable portion 24a is "scanned" on two sides by means of a first lever system constituted of two-armed levers 29 and 30. The two levers 29 and 30 are pivotally mounted on spindles 31 and 32 and are coupled together by means of a pin-and-slot connection 29a, 33. The arms 29b and 30a of the levers are constituted as feeler or scanning arms and engage two cam members 24b which are provided on the movable portion 24a of the galvanometer 24.

When the device is in its initial position, the feeler arms are lifted off the cam members 24b in a well-known manner, in order to insure free adjusting movement of the moving coil 24a. In accordance with the intensity of the existing light conditions and as determined by the light striking the photo-electric cell 34 which is electrically connected to the galvanometer 24, the movable system 24a of the galvanometer will be rotated about its axis 35 and will occupy a given predetermined angular position, placing the cam members 24b in corresponding angular positions. For the purpose of adjusting the photo-electric cell 34 and the galvanometer 24 with respect to each other there is provided a calibrating resistor 60, which is connected in series with the energizing circuit for the galvanometer. The entire organization comprising the galvanometer 24 and the arms 29 and 30 is housed in the shutter housing 1, in a manner known in the art.

The position of the movable member 24a of the galvanometer, determining the angular positions of the scanning levers 29, 30 is transmitted to the diaphragm actuating ring 27 by a second lever system which is connected to the first lever system 29, 30 and is composed of a two-armed lever 37 pivotally mounted about an axis 36. One arm 37a of the lever 37 is pivotally connected to the arm 30a of the lever 30 by means of a pin-and-slot connection. A light spring 38 biases the lever 37 in a counterclockwise direction, thereby causing the arms 29b and 30a to engage the cams 24b of the galvanometer as shown in FIG. 19. The remaining arm 37b of the lever 37 cooperates with a stepped setting cam 27b which is provided on the diaphragm actuating ring 27. The lever arm 37b has a stop lug 37c which is adapted to engage the different steps of the cam or curve 27b, thereby to limit the movement of the diaphragm actuating ring 27 as such movement is effected by the biasing spring 28. The extent of movement which the diaphragm actuating ring 27 is permitted to have depends on the angular position of the lever 37 which, in turn, depends on the angular position of the movable member 24a of the galvanometer 24. The position of the lever 37 thus permits a pre-determined clockwise turning movement of the diaphragm actuating ring 27 to be had under the action of the spring 28, such movement being halted when a step on the cam 27b comes in engagement with the stop lug 37c of the arm 37b.

There is thus attained a simple and easily operated, economical and funtionally reliable fully-automatic diaphragm setting by constituting the diaphragm as a spring-biased mechanism and by using a mechanical stop lug which is controlled by the exposure regulating device as the latter responds to the prevailing light conditions, by an action wherein the spring-biased diaphragm actuating member is locked against further movement after attaining a certain position corresponding to the prevailing light conditions.

A camera having a spring diaphragm constructed in accordance with the present invention can be operated even more simply and rapidly if the diaphragm is shifted in response to the cocking of the shutter, from its respective position as determined by the mechanical stop lug of the exposure regulating device, against the action of the diaphragm spring into an extreme end position correlated with the largest or smallest diaphragm opening, and is detained in the said position by means of a releasable locking device.

In the illustrated embodiment of the invention the ring 39 (FIG. 10) is utilized to effect the said setting of the diaphragm mechanism. The ring 39 is rotatably carried about a bearing 1d which is provided on the rear wall of the shutter housing 1, and the said ring is biased by the spring 40 which tends to hold it in an end position as shown in FIGURE 10. The ring 39 is provided with an arm 39a which is adapted to cooperate with the diaphragm actuating ring 27. The arm 39a projects into the path of movement of and drives a stop arm 27c which is provided on the diphragm actuating ring 27; during clockwise movement of the ring 39 and the arm 39a the latter shifts the stop arm 27c into its set or cocked position as shown by the broken outline in FIG. 10.

For the purpose of setting or tensioning the diaphragm against the action of the spring 28, the ring 39 is actuated in response to the cocking of the shutter by means of the shutter cocking device. This is effected by arranging a toothed gear drive comprising the gear segment 39b and gears 42 and 44, between the ring 39 and a driving spindle 41 of the shutter. The connection between the gear 44 and the driving spring 41 is arranged in the form of a "dead travel" one-way drive or lost-motion connection, in such a manner that the ring 39 is able to return to its initial position under the action of the spring 40 after the shifting of the diaphragm has been effected.

For the purpose of holding the diaphragm actuating ring 27 in its end position, a latching lever 46 is pivotally mounted on a spindle 45 carried by the rear wall of the shutter housing 1.

The latching lever 46 is biased in a counterclockwise direction by a light spring 47 and cooperates, through the intermediary of a locking nose 46a with the stop arm 27c of the diaphragm actuating ring 27 in the manner illustrated in FIG. 10. To insure a reliable locking of the diaphragm in its set or end position, it is advisable to provide an overpath or excess travel between the extreme end position of the actuating ring 27 and that position of said ring which is correlated with the largest diaphragm opening.

The release of the locking device 46 for the purpose of releasing the diaphragm for movement to the required adjusted position as determined by the setting of the stop lug 37c does not require any special action on the part of the operator as in the case of setting or locking the diaphragm in its end position, since such release is effected in response to release of the cocked shutter as accomplished by the shutter release lever 48.

In accomplishing such release of the locking device and the diaphragm the shutter release lever 48 cooperates, on the one hand, with an arm 49 of a well-known shutter release device (not fully shown for reasons of clarity) and on the other hand it cooperates with an arm 46b provided on the latching lever 46. The shutter release and the diaphragm release are so related to each other that the diaphragm reaches its adjusted position as determined by the stop lug 37c before the shutter starts to open.

An advantageous releasing action which is not adversely affected by moving the camera, is obtained when the two devices 46 and 49 are actuated simultaneously by the shutter release member 48. If this is done, the delay above mentioned with respect to the release of the shutter as required to retard the beginning of its opening movement can be produced, for example, by a well-known advance or synchronizing mechanism, the lost-motion time of which may be so regulated that the shutter only opens after a length of time which is equal to or greater than the interval correlated with the maximum path of movement of the diaphragm actuating ring 27.

Setting of the diaphragm for flash exposures by means of the previously mentioned manually settable ring 20, is effected in a simple manner and with few parts, by the provision of a stop arm 20d (FIG. 11) which is mounted on the manually operable ring 20 and which is adapted to engage and abut the same stop arm 27c which cooperates with the tension ring arm 39a and with the latching lever 46. As seen in FIG. 11, the tensioning spring 28 holds the arm 27c in engagement with the arm 20d when the exposure regulating device is switched off. To preclude accidental shifting of the manually settable ring 20 under the action of the diaphragm spring 28, the ring 20 is secured in its respective positions either by friction or else by means of a well-known detent mechanism arranged or developed on the manually settable ring 20 and on a member of the shutter which is fixedly mounted and with respect to which the setting ring is movable.

Inasmuch as the diaphragm cannot remain in its set or cocked position when the setting is to be done by hand, there is provided by the invention a simple device for automatically rendering inoperative the latching lever 46, which holds the diaphragm cocked when the setting of the camera is for "permanent light," in response to actuation of the change-over device from the "permanent light" position to the "flash" position. By this organization a simple and advantageous manner of operating the camera is had.

When the camera is set at "flash" the latching lever 46 in the illustrated embodiment of the invention is automatically made inoperative without requiring any special action or mechanism, by virtue of the locking pin 19 shifting upward (FIG. 15) to release the manually operable ring 20 of the diaphragm for movement from its initial position. For this purpose, the pin 19 is provided with a conical collar 19a which cooperates with an arm 46c of the latching lever 46 whereby the latter is freely movable when the change-over mechanism is set for "permanent light" and whereby it is shifted, when the mechanism is set for "flash" by the collar 19a into a position outside of the path of movement of the stop arm 27c of the diaphragm actuating ring 27 and is detained in this position against the action of the spring 47 (see FIGS. 12 to 15).

Further, in accordance with the invention, means are provided to insure an automatic setting of the diaphragm during the shutter release in response to the light which strikes the exposure regulating device, even in those cases where the shutter is already cocked when the camera is changed over from "flash" to "permanent light." The said means is constituted as a special device which shifts the diaphragm to its cocked or end position at the time that the camera is reversed or changed over to "permanent light."

Such subsequent setting or cocking of the diaphragm is effected, in the illustrated embodiment of the invention, in a simple and effortless manner which also does not complicate the operation of the shutter or the camera, by means of the second part 10 of the speed setting ring 3. In carrying this out, a flexible arm 50 is provided on the cam ring 12, which is fixed to the ring 10, the said arm cooperating with a lug 27d (FIG. 16) struck up from the diaphragm actuating ring 27. The disposition of the arm 50 and the lug 27d is such that when the ring 10 is shifted from "flash" setting to "permanent light" setting the arm 50 is juxtaposed to the lug 27d as seen in FIG. 16, thereby to shift the ring 27 into its cocked position. The inner periphery of the side wall of the shutter housing 1 (FIGS. 16 and 17) is provided with a camming projection 51 adapted to engage the flexible arm 50 when the diaphragm actuating ring 37 attains its cocked position, thereby to disengage the arm 50 from the driving lug 27d (FIG. 17).

In order to enable a better understanding to be had of the cooperation of the various setting and actuating rings of the present improved shutter, a graphic illustration or chart is shown in FIG. 18, giving the relationships of the movements of the separate rings. The basis of reference for the size or extent of the adjusting paths of the rings and for the graduations of the setting scales 8, 52 and 53 for film sensibility, speed and diaphragm respectively as associated with the rings, is the angular value alpha, the alpha units being extended along a straight line which corresponds to the angular adjusting movement of one diaphragm value. The paths of movement and the setting scales of the setting ring 9 for film sensibility (b), of the exposure time or speed setting rings 10, 12(c) of the diaphragm actuating ring 27(d) and of the manually operable ring 20(e) for the diaphragm are drawn on the four additional lines b, c, d and e.

The said rings have paths of movement in accordance with the following values:

Ring 9: 4 alpha film sensibility setting path.

Rings 10, 12: 4 alpha exposure time setting path plus 1 alpha excess plus 7 alpha diaphragm adjusting path.

Ring 27: 7 alpha diaphragm adjusting path plus 1 alpha excess path.

Ring 20: 7 alpha diaphragm adjusting path plus 1 alpha excess path.

The paths of motion extend on the reference line "a" as follows:

For ring 9: from 0 to 4 alpha.

For rings 10, 12: from 0 to 12 alpha, the angular path 4 alpha to 12 alpha to be correlated with an exposure time of 1/30 of a second.

For ring 27: from 4 alpha to 12 alpha, the angular path from 4 alpha to 5 alpha representing the excess path of the ring 27 with respect to the largest diaphragm opening 2.0.

For ring 20: from 5 alpha to 13 alpha the angular path between 12 alpha and 13 alpha constituting the excess path of the ring 20 with respect to the smallest diaphragm opening 22.

Further, in accordance with the invention, there is provided a warning device which may be optically, acoustically or mechanically acting, and which may be of a known kind, especially a warning device which is visible in the camera view finder, and which becomes operative when the light intensity corresponding to the minimum or maximum operating range of the camera is exceeded.

When the operator takes permanent light photographs, in which the diaphragm is set automatically in response to the light acting on the exposure regulating device, the warning device will apprise the operator that the resulting value for the diaphragm would be outside the values or the figures which the camera may take care of.

The above-described shutter functions, and is operated in the following manner:

(a) Permanent-light exposures: In exposures of this kind, the ring 10 is placed in the setting position shown in FIG. 2 and is coupled with the ring 9 by means of the coupling device 9b, 17a. An adjustment of the ring 9 for the purpose of setting the camera for a new film sensibility thereby causes (by means of the exposure time cam ring 12 which is fixedly connected to the ring 10) a proper setting of the shutter speed which is correlated with this film sensibility.

Setting of the diaphragm in the above-mentioned position of the ring 10 takes place automatically in response to the light which acts on the exposure regulating device. The manually operable ring 20 is locked in its initial or end position by the locking pin 19, while the latching lever 46 is in operative position and retains the diaphragm actuating ring 27 in its cocked position against the action of the spring 28 after the ring 27 has been set either by means of the setting device 27c and 39 to 44 coupled with the shutter cocking mechanism, or else by means of the manually operable setting device 10, 12, 27d, 50.

The diaphragm is released by the shutter release member 48 at the time that the shutter is released. During this operation, the latching lever 46 is rendered inoperative by being shifted against the action of its spring 47 so as to be disengaged from the arm 27c of the diaphragm actuating ring 27, and in consequence the ring 27 is shifted under the action of the spring 28. As the ring 27 moves it will be brought into engagement with the stop lug 37c of the exposure regulating device by virtue of a step of the toothed portion 27b abutting the lug 37c. The diaphragm opening which corresponds to the prevailing light conditions is thus fully automatically set in the shutter.

(b) Flashlight exposures: First the coupling connections 9b, 17a between the rings 9 and 10 is released by depressing the fingerpiece 18, and the ring 10 is shifted and made to occupy the position shown in FIG. 1, in which the setting marks 15 and 16 marked with the flash symbols are brought into coincidence with each other. This shifting of the ring 10 has the following effect:

(1) The exposure regulating device is switched off by closing the short-circuiting switch 23.

(2) The manual setting ring 20 of the diaphragm is released by the locking pin or detent 19.

(3) The latching lever 46 which retains the diaphragm in cocked position is made inoperative by the collar 19a of the locking pin.

Both in the cocked and the released conditions of the shutter, the arm 27c of the diaphragm actuating ring 27 abuts the stop arm 20d of the manually settable ring 20 and the ring 27 thus can be shifted by the settable ring 20 for the purpose of manually setting the diaphragm. As is known, the diaphragm in the case of flash exposures is set in response to the type of flashbulb which is to be used, and also in response to the distance selected, and this setting is semi-automatic in the shutter of the illustrated embodiment of the invention.

In effecting such setting, two scale rings 54 and 55 are arranged on the outer periphery of the cylindrical jacket 20e of the manually settable ring 20 for the diaphragm, the said cylindrical jacket over-lapping the rear wall of the shutter housing 1 (FIGS. 1 and 2). The ring 54 is fixedly secured to the manually settable ring 20 and carries a scale 56 identified by flash bulb types and values, the scale 56 having flash lamp values 28, 40, 55 and 80, also lamp designations XM1, XM5, PF1 and PF5, whereas the ring 55 is adjustable with respect to the ring 54 and has an index mark 57 adapted to cooperate with the scale 56. Also, the ring 55 has a scale 58 provided with distance values which may be referred to the film sensibility index mark 11 convenient adjustment of the ring 55 is made possible by the provision of a small handle 59 carried by the ring as seen in FIGS. 1 and 2.

In order to enable the diaphragm to be correctly set for flash exposures, it is now merely necessary to set the characteristic symbol or number of the flashbulb used, as found on the scale 56, opposite to the index mark 57, and to then turn the manually settable ring 20 until the proper distance number on the scale 58 is brought opposite to the index mark 11, the said distance number being that obtained from the setting of the focussing ring 6 and being found on the distance scale 7.

Instead of following the above-described manner of setting the diaphragm for flash exposures, the diaphragm may also be set in the customary manner, by using a diaphragm scale arranged on the manually settable ring 20. This would obviate the use of the scale rings 54 and 55 and the diaphragm scale would, for example, be mounted on the cylindrical jacket 20e of the ring 20. However, this manner of setting the diaphragm does not attain the high degree of simplicity of operation brought about by the organization as provided in the illustrated embodiment of the invention, since the operator must cope with the expression "diaphragm" which may be not readily understandable to him.

The present embodiment of the invention discloses an intralens shutter which is arranged for fully automatic exposure setting.

Variations and modifications may be made within the scope of the claims, and portions of the improvement may be used without others.

I claim:

1. In a photographic camera, in combination, a speed setting member and a diaphragm actuating member, said members being individually adjustable to several positions; means including a light-responsive exposure regulating device for effecting adjustment of the diaphragm actuating member in accordance with existing light conditions; and a film sensibility scale associated with the speed setting member, said scale having a graduated set of film sensibility indications arranged for referral to an index mark on the speed setting member, and said scale and speed setting member being so constituted that the positioning of the latter when bringing the index mark in coincidence with consecutive values on the scale will effect a series of uniformly graduated shutter speeds having values suitable for taking pictures by hand.

2. The invention as defined in claim 1 in which the speed setting member has two relatively movable parts, the first part of which carries the said index mark and is cooperable with the film sensibility scale, the second of said parts cooperating with the shutter speed mechanism; means for releasably coupling said parts in a single relative position for concurrent movement over the range of the film sensibility scale, said parts having cooperable indicia referring to permanent light for indicating the said position, the said second part when uncoupled from the first part being movable to an additional position for effecting flash-exposure speeds; and means referring to the use of flash bulbs, for indicating the said additional position of the second part.

3. The invention as defined in claim 2 in which the releasable coupling means includes a single manually operable member disposed on the said second part and a detent notch on the first part, arranged for engagement by the manually operable member, and in which there is a fixed member on the camera, engageable by the said manually operable member alternately with the detent notch, for releasably holding the second part in the said additional position.

4. The invention as defined in claim 2, in which there is a manually-operable diaphragm setting member separate from the diaphragm actuating member, and in which there is a change-over device for setting the camera for either daylight exposures or flash exposures involving respectively either automatic or manual control of the diaphragm, said change-over device comprising means for rendering the exposure-regulating device inoperative and comprising a drive for connecting said diaphragm setting member to the diaphragm actuating member to effect a manual adjustment of the latter and of the diaphragm in response to actuation of the diaphragm setting member.

5. The invention as defined in claim 4 in which there is means responsive to movement of the said second part, for actuating the change-over device to either "daylight" or "flash" settings, said second part effecting a flash setting when it is in the said additional position.

6. The invention as defined in claim 4, in which the change-over device further comprises a movable member cooperable with the said manually operable diaphragm setting member and constituting a latch device for locking the said setting member in an initial position effecting either the smallest or else the largest diaphragm opening when the change-over device is set for "daylight."

7. The invention as defined in claim 6, in which there is means responsive to movement of said second part for actuating the change-over device to either "daylight" or "flash" settings, including a driving connection between the movable member constituted as the latch device and the said second part whereby the latter may actuate the member, said second part being constituted as a ring arranged coaxially with respect to the camera shutter.

8. The invention as defined in claim 6, in which there is means responsive to movement of said second part, for actuating the change-over device to either "daylight" or "flash" settings, said second part effecting a flash setting when it is in the said additional position, and in which there is another latch device controlled by the diaphragm setting member, said other latch device locking the said second part in said additional position effecting a "flash" setting of the change-over device, when the diaphragm setting member is out of its said initial position.

9. The invention as defined in claim 6, in which the diaphragm setting member may move slightly beyond the said initial position in which it is to be locked, to facilitate the locking of the member by the said latch device.

10. The invention as defined in claim 4, in which there is a spring means biasing the diaphragm to an extreme position corresponding to its smallest or its largest opening, in which there is an abutment lug which is variously positioned when the exposure regulating device responds to the existing light conditions, and in which the diaphragm actuating member has abutments engageable with the said lug to halt the actuating member in different operative positions.

11. The invention as defined in claim 10, in which there is means for shifting the diaphragm in response to cocking of the camera shutter from any of its different operative positions and against the action of said spring means into an extreme position associated with either the largest or else the smallest diaphragm opening, and in which there are means for releasably locking the diaphragm in said extreme position.

12. The invention as defined in claim 11, in which there is means for rendering the diaphragm locking means inoperative in response to release of the cocked shutter, the said diaphragm actuating member attaining its operative position prior to opening of the shutter.

13. The invention as defined in claim 11, in which there is a connector member coupled to the diaphragm to actuate the latter and coupled to shutter cocking device to be driven thereby, said diaphragm actuating member having a lug adapted for abutment by the connector member to shift the diaphragm to its extreme position, said connector member returning alone to an initial position after such shifting of the diaphragm.

14. The invention as defined in claim 10, in which the said drive to effect manual adjustment of the diaphragm actuating member and diaphragm for the purpose of taking "flash" pictures comprises an abutment lug on the actuating member and a cooperable driving lug on the diaphragm setting member, in which the spring means biases the actuating member to effect engagement of the said lugs when the change-over device is set for flash exposures, said setting member being immovable under the action of said spring means.

15. The invention as defined in claim 11, in which there is means for rendering inoperative the diaphragm locking means when the change-over device is set in "flash" position.

16. The invention as defined in claim 15 in which the change-over device comprises a movable member cooperable with the said manually operable diaphragm setting member and constituting a latch device for locking the said setting member in an initial position effecting either the smallest or else the largest diaphragm opening when the change-over device is set for daylight, and in which the means for rendering inoperative the diaphragm locking means includes the said movable member.

17. The invention as defined in claim 10, in which there is means for shifting the diaphragm toward its opposite extreme position when the change-over device is set to the "daylight" setting.

18. The invention as defined in claim 17, in which the said means for shifting the diaphragm is actuated in response to movement of the said second part as required to effect the "daylight" setting of the change-over device.

References Cited in the file of this patent

UNITED STATES PATENTS

| | | |
|---|---|---|
| 2,418,370 | Simmon | Apr. 1, 1947 |
| 2,576,813 | Simons | Nov. 27, 1951 |
| 2,780,971 | Fahlenberg | Feb. 12, 1957 |
| 2,917,983 | Gebele | Dec. 22, 1959 |